(12) United States Patent
Cartales

(10) Patent No.: US 8,291,416 B2
(45) Date of Patent: Oct. 16, 2012

(54) METHODS AND SYSTEMS FOR USING A PLURALITY OF HISTORICAL METRICS TO SELECT A PHYSICAL HOST FOR VIRTUAL MACHINE EXECUTION

(75) Inventor: John Cartales, Malden, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 763 days.

(21) Appl. No.: 12/425,907

(22) Filed: Apr. 17, 2009

(65) Prior Publication Data

US 2010/0269109 A1    Oct. 21, 2010

(51) Int. Cl.
*G06F 9/455* (2006.01)
*G06F 9/46* (2006.01)

(52) U.S. Cl. ............. 718/1; 718/102; 718/104; 718/105
(58) Field of Classification Search .................. None
See application file for complete search history.

(56) References Cited

U.S. PATENT DOCUMENTS

| | | | |
|---|---|---|---|
| 2004/0143664 A1* | 7/2004 | Usa et al. ...................... | 709/226 |
| 2006/0167984 A1 | 7/2006 | Fellenstein et al. | |
| 2006/0259621 A1* | 11/2006 | Ranganathan et al. ....... | 709/226 |
| 2007/0130566 A1* | 6/2007 | van Rietschote et al. ......... | 718/1 |
| 2008/0177424 A1 | 7/2008 | Wheeler | |
| 2008/0201479 A1* | 8/2008 | Husain et al. ................. | 709/227 |
| 2008/0250415 A1 | 10/2008 | Illikkal et al. | |
| 2008/0271038 A1* | 10/2008 | Rolia et al. ..................... | 718/105 |
| 2008/0295096 A1* | 11/2008 | Beaty et al. ........................ | 718/1 |
| 2009/0113422 A1* | 4/2009 | Kani ................................ | 718/1 |
| 2009/0133018 A1* | 5/2009 | Kaneki ............................. | 718/1 |
| 2009/0288092 A1* | 11/2009 | Yamaoka ...................... | 718/104 |
| 2010/0058349 A1* | 3/2010 | Diwakar et al. .............. | 718/104 |

OTHER PUBLICATIONS

International Preliminary Report on Patentability on PCT/US2010/031221 dated Oct. 18, 2011.
International Search Report on PCT/US2010/031221 dated Oct. 8, 2010.
Written Opinion on PCT/US2010/031221 dated Oct. 8, 2010.

* cited by examiner

*Primary Examiner* — Meng An
*Assistant Examiner* — Tammy Lee
(74) *Attorney, Agent, or Firm* — Foley and Lardner LLP; John D. Lanza

(57) ABSTRACT

A host recommendation service identifies a virtual machine. An analysis engine retrieves a plurality of metrics for each of a plurality of physical hosts available for executing the virtual machine. The plurality of metrics includes a current level of load on each of the plurality of physical hosts and a level of load on each of the plurality of physical hosts during a prior time period. The analysis engine also identifies a level of load placed on a physical host by the virtual machine during a prior time period. The analysis engine determines a level of priority associated with the metrics and assigns a score to each of the plurality of physical hosts. The host recommendation service transmits an identification of one of the plurality of physical hosts on which to execute the virtual machine.

26 Claims, 7 Drawing Sheets

METHODS AND SYSTEMS FOR USING A PLURALITY OF HISTORICAL METRICS TO SELECT A PHYSICAL HOST FOR VIRTUAL MACHINE EXECUTION

FIELD OF THE INVENTION

This disclosure generally relates to systems and methods for executing virtual machines. In particular, this disclosure relates to methods and systems for evaluating historical metrics in selecting a physical host for execution of a virtual machine.

BACKGROUND OF THE INVENTION

Typical methods for identifying physical machines to host virtual machines include monitoring load on networked machines may include a first machine (which may be referred to as a collator or resource manager) evaluating a current status of a plurality of other machines (which may be referred to as a workers) and determining whether to place a virtual machine on a particular worker machine. Typically, however, the resource management machine does not have access to status metrics for the worker machines over a period of time, including historical data, or to status metrics for a particular virtual machine, such as what level of load the virtual machine placed on host physical machines during previous execution sessions. Lacking the ability to evaluate historical data complicates or, in some systems, prevents an administrator's ability to evaluate workload trends over time and to predict future workload requirements, which may result in suboptimal selection of worker machines on which to execute virtual machines.

BRIEF SUMMARY OF THE INVENTION

In one aspect, a method for evaluating historical metrics in selecting a physical host for execution of a virtual machine includes receiving, by a host recommendation service, an identification of a virtual machine and a request for an identification of a physical host on which to execute the virtual machine. The method includes retrieving, by an analysis engine in communication with the host recommendation service, a plurality of metrics for each of a plurality of physical hosts available for executing the virtual machine, the plurality of metrics including a first metric identifying a current level of load on each of the plurality of physical hosts and including a second metric identifying a level of load on each of the plurality of physical hosts during a time period prior to the current time period. The method includes retrieving, by the analysis engine, a plurality of metrics associated with the virtual machine, the plurality of metrics including at least one metric identifying a level of load placed on a physical host by the virtual machine during a time period prior to the current time period. The method includes determining, by the analysis engine, a level of priority associated with at least one of the first metric identifying a current level of load on each of the plurality of physical hosts and the second metric identifying a level of load on each of the plurality of physical hosts during a time period prior to the current time period. The method includes assigning, by the analysis engine, a score to each of the plurality of physical hosts, responsive to the retrieved pluralities of metrics and to the determined level of priority. The method includes transmitting, by the host recommendation service, an identification of one of the plurality of physical hosts on which to execute the virtual machine.

In one embodiment, the method includes retrieving, by the analysis engine, the plurality of metrics for each of the plurality of physical hosts available for executing the virtual machine, the plurality of metrics including a third metric identifying a level of load on each of the plurality of physical hosts during a time period prior to the time period for which the second metric identified the level of load on each of the plurality of physical hosts. In another embodiment, the method includes identifying, by the analysis engine, a first physical host in the plurality of physical hosts for execution of the virtual machine, the first physical host having a higher score than a second physical host in the plurality of physical hosts. In still another embodiment, the method includes identifying, by the analysis engine, a first physical host in the plurality of physical hosts for execution of the virtual machine, the first physical host including at least one characteristic for maximizing the performance of the virtual machine. In still even another embodiment, the method includes identifying, by the analysis engine, a first physical host in the plurality of physical hosts for execution of the virtual machine, the first physical host executing a second virtual machine. In yet another embodiment, the method includes identifying, by the analysis engine, a first physical host in the plurality of physical hosts for execution of the virtual machine, the first physical host including at least one characteristic required for execution of the virtual machine. In some embodiments, the method includes assigning, by the analysis engine, a score including a sub-score assigned to a resource provided by each of the plurality of physical hosts, responsive to the retrieved pluralities of metrics. In other embodiments, the method includes transmitting, by the analysis engine, the identification of one of the plurality of physical hosts on which to execute the virtual machine.

In another aspect, a system for evaluating historical metrics in selecting a physical host for execution of a virtual machine includes a pool management component, a host recommendation service, and an analysis engine. The pool management component requests an identification of a physical host on which to execute a virtual machine. The host recommendation service executes on a second computing device and receives the request for the identification of the physical host. The analysis engine executes on the second computing device and receives, from the host recommendation service, the request for the identification of the physical host on which to execute the virtual machine. The analysis engine retrieves a plurality of metrics including a first metric identifying a current level of load on each of a plurality of physical hosts and including a second metric identifying a level of load on each of the plurality of physical hosts during a time period prior to the current time period. The analysis engine retrieves a plurality of metrics associated with the virtual machine, the plurality of metrics including at least one metric identifying a level of load placed on a physical host by the virtual machine during a time period prior to the current time period. The analysis engine determines a level of priority associated with at least one of the first metric identifying a current level of load on each of the plurality of physical hosts and the second metric identifying a level of load on each of the plurality of physical hosts during a time period prior to the current time period. The analysis assigns a score to each of the plurality of physical hosts, responsive to the retrieved pluralities of metrics and the determined level of priority. The analysis engine transmits, to the host recommendation service, an identification of one of the plurality of physical hosts on which to execute the virtual machine.

In one embodiment, the host recommendation service includes a customization interface for receiving an identification of a characteristic required for execution of the virtual machine. In another embodiment, the host recommendation service includes a customization interface for receiving an identification of a customization to an algorithm applied to assign the score to each of the plurality of physical hosts. In still another embodiment, the host recommendation service includes a user interface for receiving a request for an identification of a physical host on which to execute the virtual machine. In yet another embodiment, the host recommendation service includes a user interface for receiving a request for an identification of a physical host to which to migrate the virtual machine. In some embodiments, the host recommendation service includes a customization interface allowing a user to specify a level of priority to assign to a time period during which at least one metric is generated.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
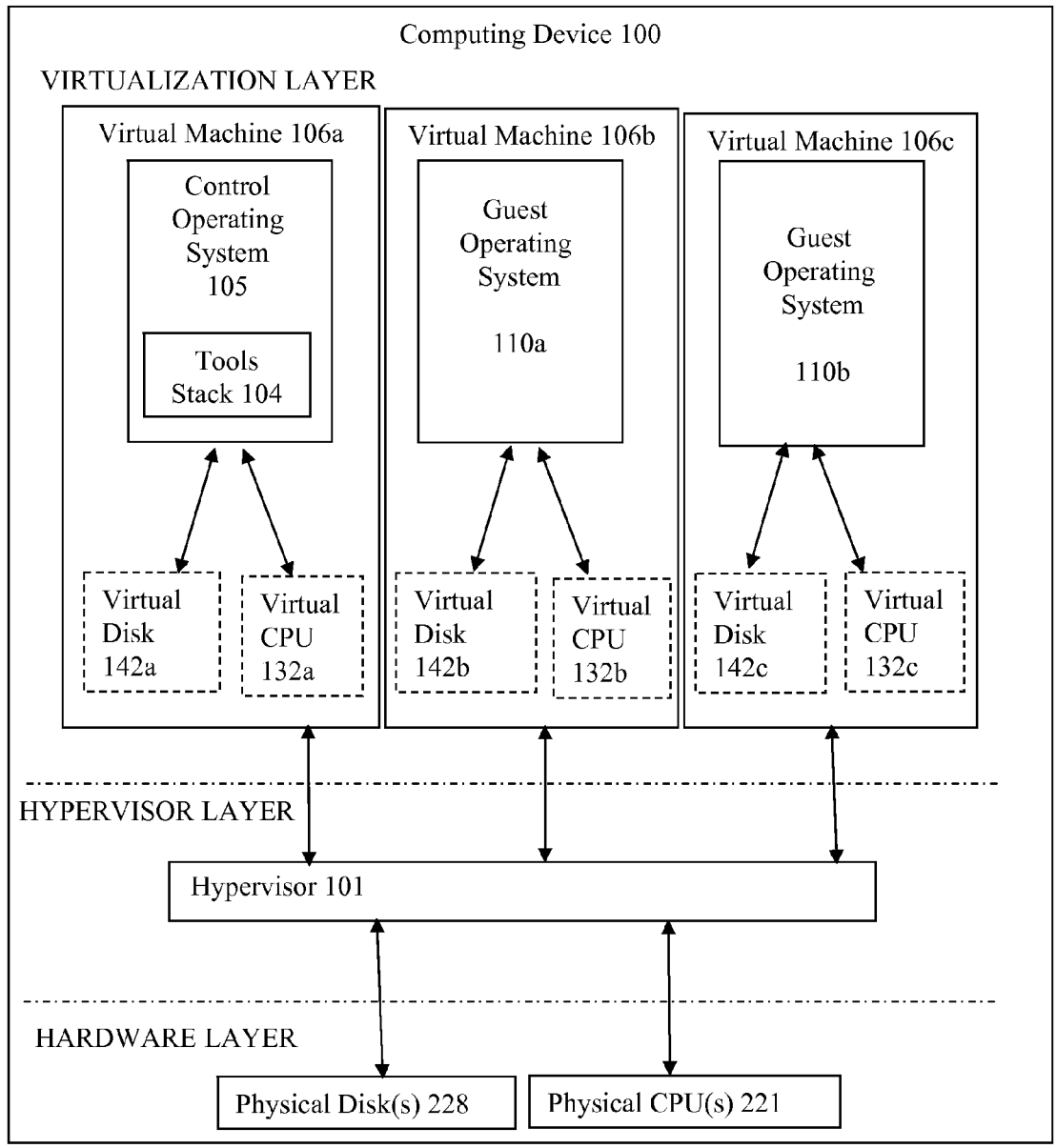
FIG. 1A is a block diagram depicting an embodiment of a computing environment comprising a hypervisor layer, a virtualization layer, and a hardware layer.

Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 101 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 110 may be referred to as a virtual machine 106. A virtual machine 106 may include a control operating system 105 in communication with the hypervisor 101 and used to execute applications for managing and configuring other virtual machines on the computing device 100.

Referring now to FIG. 1A, and in greater detail, a hypervisor 101 may provide virtual resources to an operating system in any manner which simulates the operating system having access to a physical device. A hypervisor 101 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 101 executes within an operating system executing on a computing device. In one of these embodiments, a computing device executing an operating system and a hypervisor 101 may be said to have a host operating system (the operating system executing on the computing device), and a guest operating system (an operating system executing within a computing resource partition provided by the hypervisor 101). In other embodiments, a hypervisor 101 interacts directly with hardware on a computing device, instead of executing on a host operating system. In one of these embodiments, the hypervisor 101 may be said to be executing on "bare metal," referring to the hardware comprising the computing device.

In some embodiments, a hypervisor 101 may create a virtual machine 106a-c (generally 106) in which an operating system 110 executes. In one of these embodiments, for example, the hypervisor 101 loads a virtual machine image to create a virtual machine 106. In another of these embodiments, the hypervisor 101 executes an operating system 110 within the virtual machine 106. In still another of these embodiments, the virtual machine 106 executes an operating system 110.

In some embodiments, the hypervisor 101 controls processor scheduling and memory partitioning for a virtual machine 106 executing on the computing device 100. In one of these embodiments, the hypervisor 101 controls the execution of at least one virtual machine 106. In another of these embodiments, the hypervisor 101 presents at least one virtual machine 106 with an abstraction of at least one hardware resource provided by the computing device 100. In other embodiments, the hypervisor 101 controls whether and how physical processor capabilities are presented to the virtual machine 106.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 101 executes the control operating system 105 within a virtual machine 106 created by the hypervisor 101. In still another embodiment, the control operating system 105 executes in a virtual machine 106 that is authorized to directly access physical resources on the computing device 100. In some embodiments, a control operating system 105a on a computing device 100a may exchange data with a control operating system 105b on a computing device 100b, via communications between a hypervisor 101a and a hypervisor 101b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 105 executes in a virtual machine 106 that is authorized to interact with at least one guest operating system 110. In another embodiment, a guest operating system 110 communicates with the control operating system 105 via the hypervisor 101 in order to request access to a disk or a network. In still another embodiment, the guest operating system 110 and the control operating system 105 may communicate via a communication channel established by the hypervisor 101, such as, for example, via a plurality of shared memory pages made available by the hypervisor 101.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 104. In another embodiment, a tools stack 104 provides functionality for interacting with the hypervisor 101, communicating with other control operating systems 105 (for example, on a second computing device 100b), or managing virtual machines 106b, 106c on the computing device 100. In another embodiment, the tools stack 104 includes customized applications for providing improved management functionality to an administrator of a virtual machine farm. In some embodiments, at least one of the tools stack 104 and the control operating system 105 include a management API that provides an interface for remotely configuring and controlling virtual machines 106 running on a computing device 100. In other embodiments, the control operating system 105 communicates with the hypervisor 101 through the tools stack 104.

In one embodiment, the hypervisor 101 executes a guest operating system 110 within a virtual machine 106 created by the hypervisor 101. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 101; in such an embodiment, the driver is typically aware that it executes within a virtualized environment.

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above.

Figure 1B:
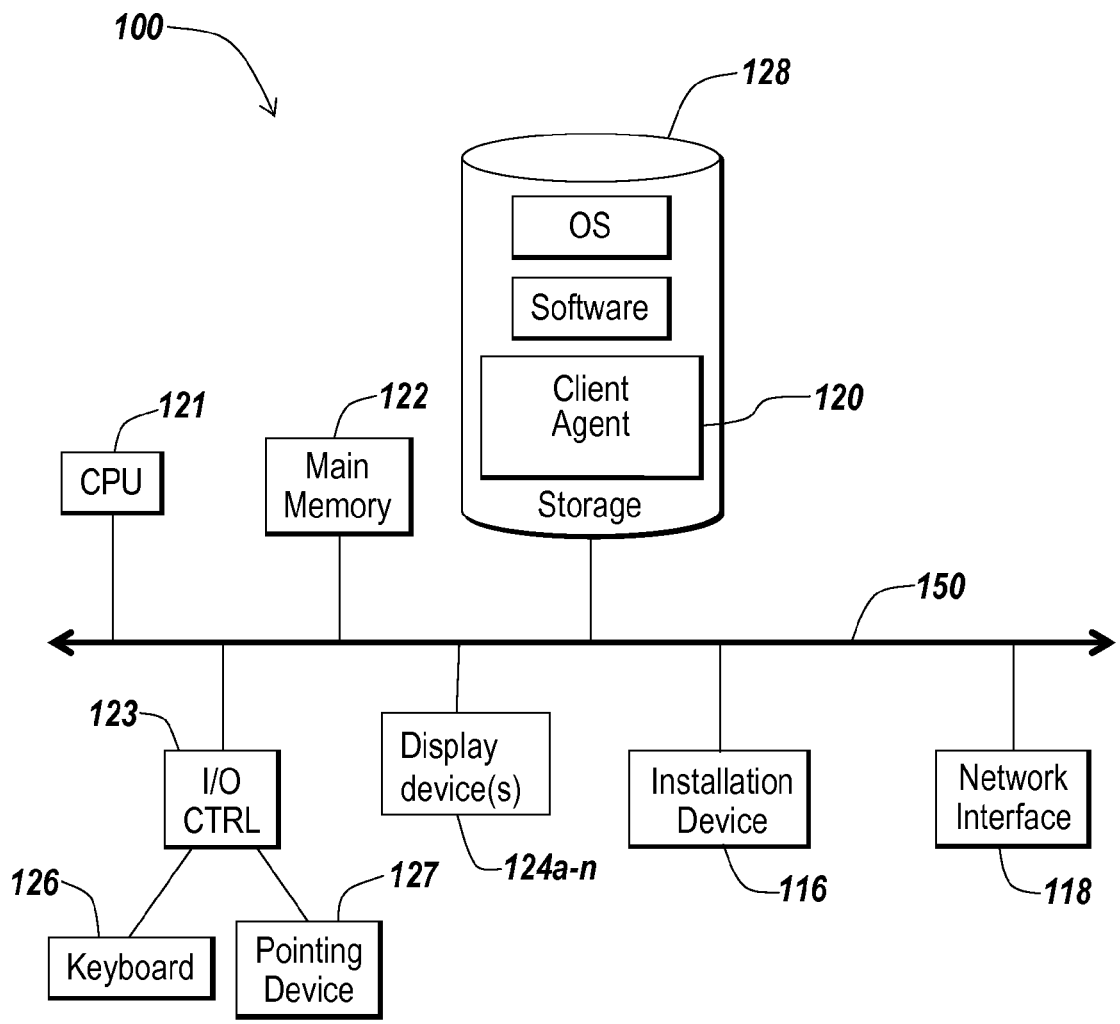
FIGS. 1B-1E are block diagrams depicting embodiments of computing devices useful in connection with the methods and systems described herein.
Figure 1C:
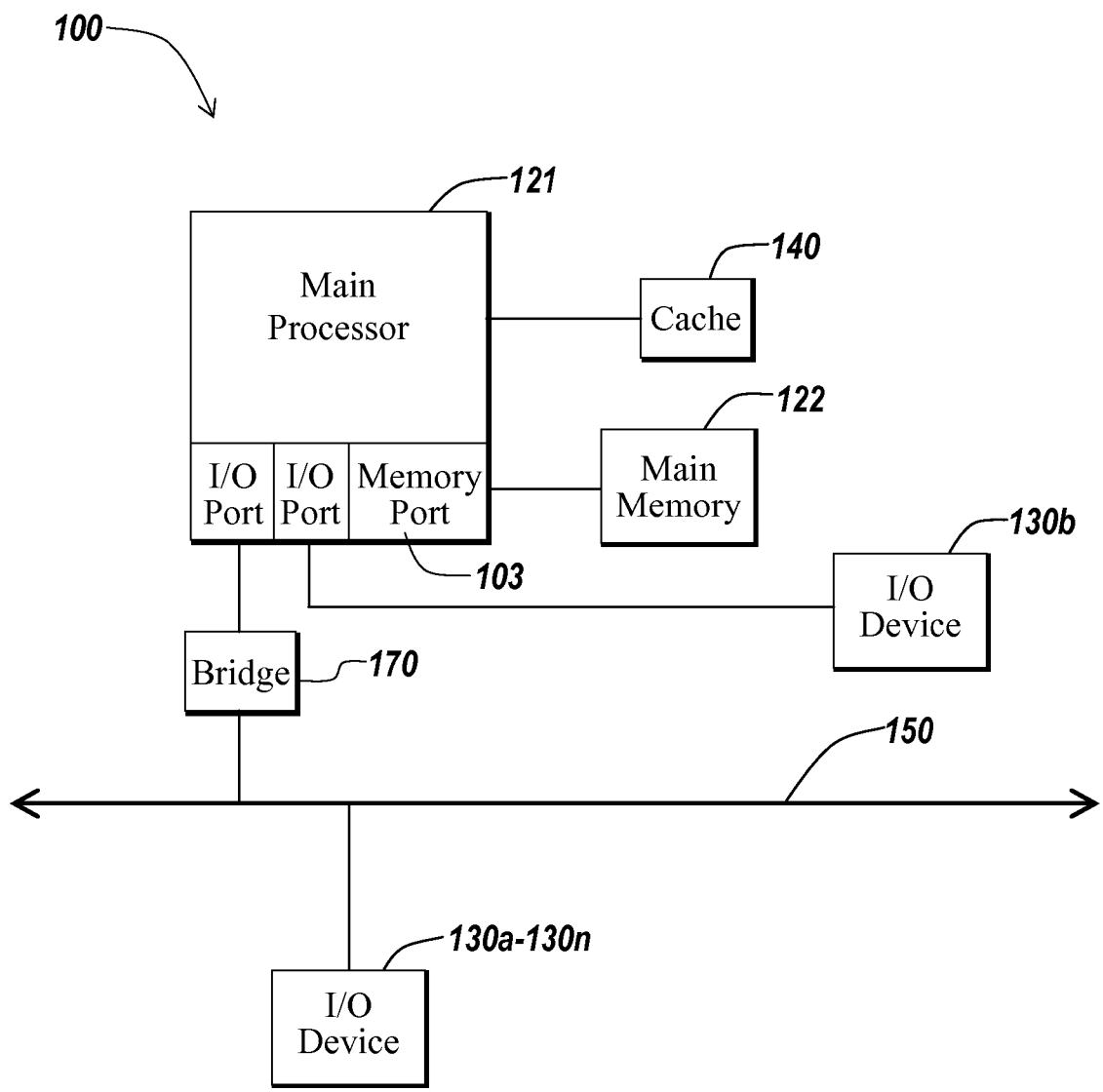

The computing device 100 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 1060, 600, 650, 680, 700p, 700w/wx, 750, 755p, 800w, Centro, Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, i576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple, Inc., or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 may be web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In one embodiment, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first, client computing device 100a communicates with a second, server computing device 100b. In one embodiment, the client communicates with one of the computing devices 100 in a server farm. Over the network, the client can, for example, request execution of various applications hosted by the computing devices 100 in the server farm and receive output data of the results of the application execution for display. In one embodiment, the client executes a program neighborhood application to communicate with a computing device 100 in a server farm.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1D:
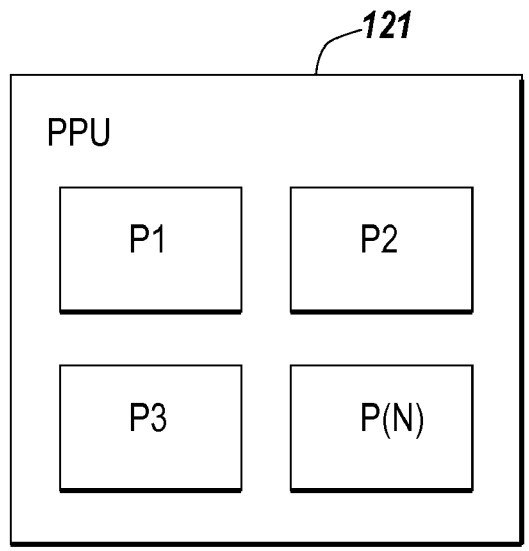

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
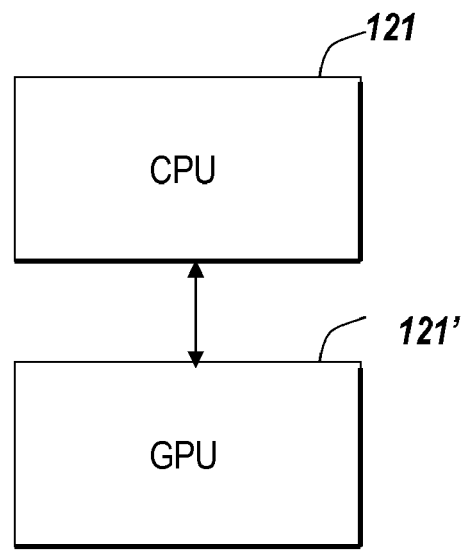

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2:
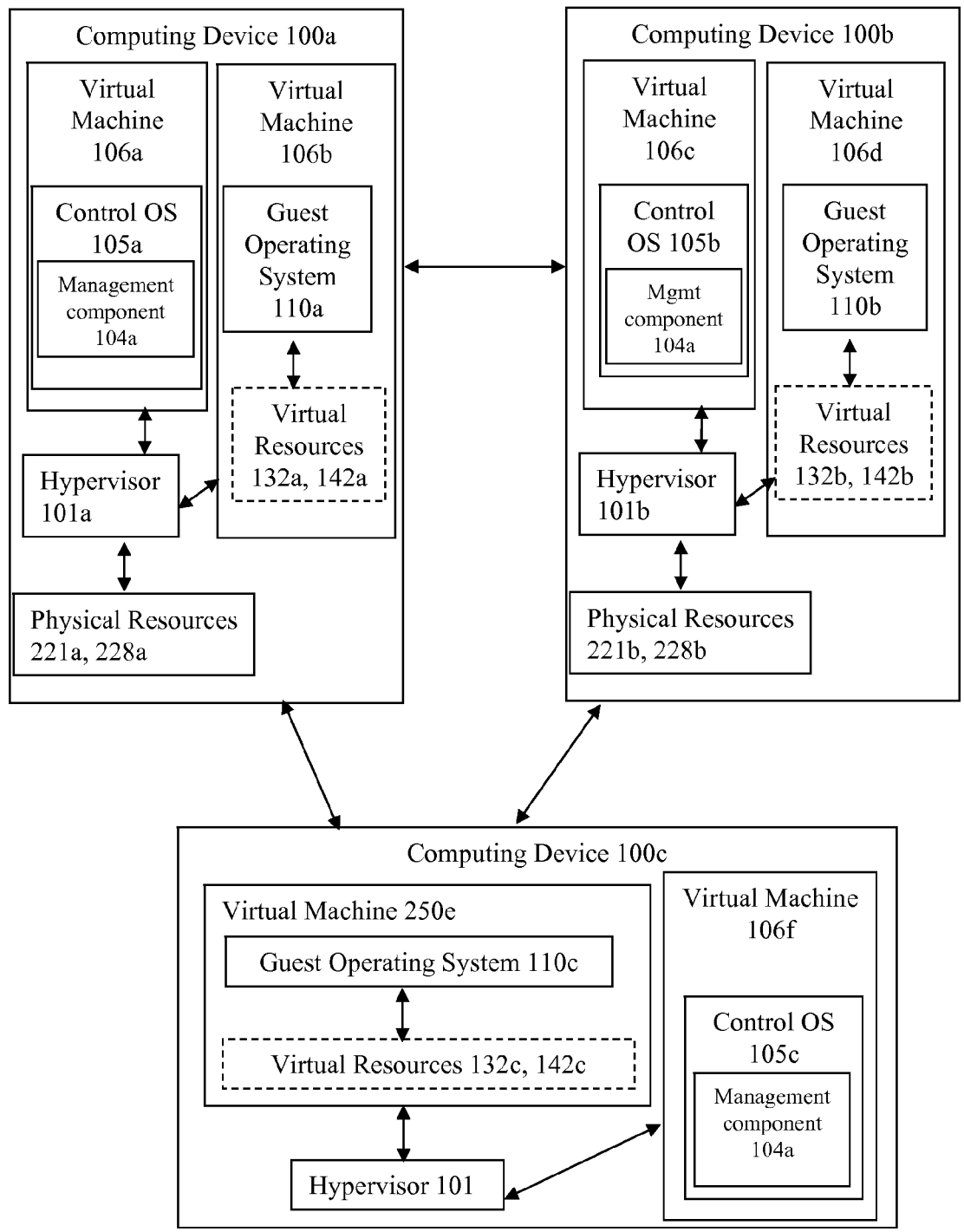
FIG. 2 is a block diagram depicting an embodiment of a plurality of networked computing devices in a system in which at least one physical host executes a virtual machine.

Referring now to FIG. 2, a block diagram depicts one embodiment of a plurality of networked computing devices in a system in which at least one physical host executes a virtual machine. In brief overview, the system includes a management component 104 and a hypervisor 101. The system includes a plurality of computing devices 100, a plurality of virtual machines 106, a plurality of hypervisors 101, a plurality of management components referred to as tools stacks 104, and a physical resource 260. The plurality of physical machines 100 may each be provided as computing devices 100, described above in connection with FIGS. 1A-C.

Referring now to FIG. 2, and in greater detail, a physical disk 228 is provided by a computing device 100 and stores at least a portion of a virtual disk 142. In some embodiments, a virtual disk 142 is associated with a plurality of physical disks 228. In one of these embodiments, and as described above in connection with FIGS. 1A-C, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 106 executes is referred to as a physical host 100 or as a host machine 100.

In one embodiment, the management component 104a is referred to as a pool management component 104a. In another embodiment, a management operating system 105a, which may be referred to as a control operating system 105a, includes the management component. In some embodiments, the management component is referred to as a tools stack. In one of these embodiments, the management component is the tools stack 104 described above in connection with FIGS. 1A-1C. In other embodiments, the management component 104 provides a user interface for receiving, from a user such as an administrator, an identification of a virtual machine 106 to provision and/or execute. In still other embodiments, the management component 104 provides a user interface for receiving, from a user such as an administrator, the request for migration of a virtual machine 106b from one physical machine 100 to another. In further embodiments, the management component 104a identifies a computing device 100b on which to execute a requested virtual machine 106d and instructs the hypervisor 101b on the identified computing device 100b to execute the identified virtual machine; such a management component may be referred to as a pool management component.

Figure 3:
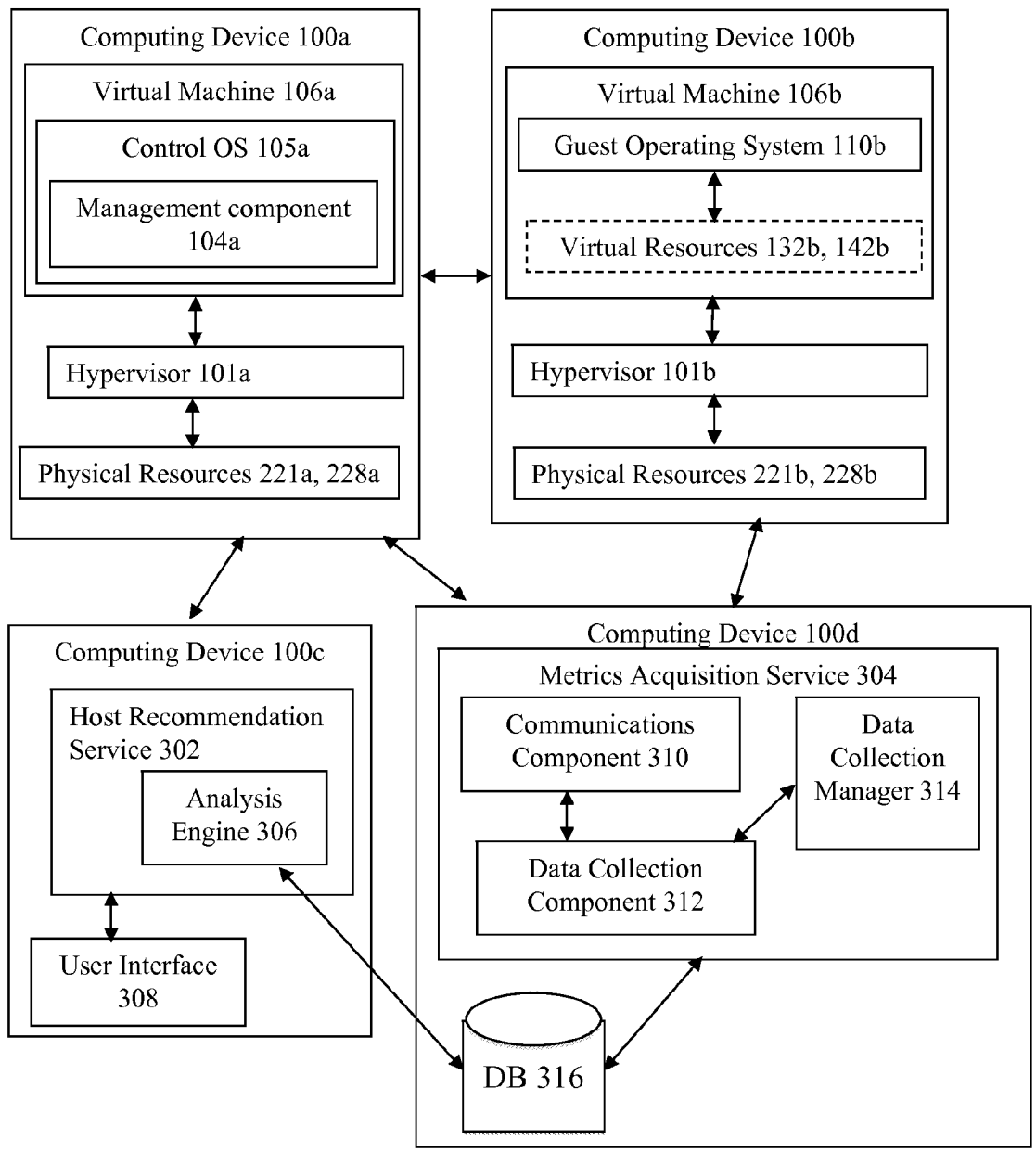
FIG. 3 is a block diagram depicting an embodiment of a system for evaluating historical metrics in selecting a physical host for execution of a virtual machine.

Referring now to FIG. 3, a block diagram depicts one embodiment of a system for evaluating historical metrics in selecting a physical host for execution of a virtual machine. In brief overview, the system includes a plurality of computing devices, at least one virtual machine 106, a pool management component 104a, a host recommendation service 302, and an analysis engine 306. The pool management component 104a executes on a first computing device 100a and requests an identification of a physical host 100 on which to execute a virtual machine 106. The host recommendation service 302 executes on a second computing device 100c and receives the request for the identification of the physical host 100. The analysis engine 306 executes on the second computing device 100c and receives, from the host recommendation service 302, the request for the identification of the physical host 100. The analysis engine 306 retrieves a plurality of metrics including a first metric identifying a current level of load on each of a plurality of physical hosts and including a second metric identifying a level of load on each of the plurality of physical hosts during a time period prior to the current time period. The analysis engine 306 retrieves a plurality of metrics associated with the virtual machine, the plurality of metrics including at least one metric identifying a level of load placed on a physical host by the virtual machine during a time period prior to the current time period. The analysis engine 306 determines a level of priority associated with at least one of the first metric identifying a current level of load on each of the plurality of physical hosts and the second metric identifying a level of load on each of the plurality of physical hosts during a time period prior to the current time period. The analysis engine 306 assigns a score to each of the plurality of physical hosts, responsive to the retrieved pluralities of metrics and to the determined level of priority. The analysis engine 306 transmits, to the host recommendation service 302, an identification of one of the plurality of physical hosts 100 on which to execute the virtual machine.

In some embodiments, a management component communicates with a host recommendation service 302 to identify a computing device on which to execute a virtual machine 106. In one of these embodiments, the host recommendation service 302 transmits to the request to an analysis engine 306, which evaluates present and historical metrics identifying levels of load on physical hosts (computing devices 100) that are available to execute the virtual machine 106 and applies an algorithm to the evaluated metrics to identify an optimal physical host 100 for executing the virtual machine 106. In another of these embodiments, the host recommendation service 302 includes functionality allowing users to identify what characteristics to optimize—for example, whether to optimize for maximum performance of a virtual machine or to optimize for maximum density of virtual machines on physical hosts. In still another of these embodiments, the system includes a metrics acquisition service 304 that provides functionality for collecting performance data from hypervisors, virtual machines, and physical hosts and generating metrics based upon the performance data for use in identifying an optimal physical host. In still even another of these embodiments, the host recommendation service 302 includes functionality for allowing administrators the ability to define which hypervisor hosts will be monitored for performance data. In yet another of these embodiments, the host recommendation service 302 includes functionality for generating reports regarding hypervisor and virtual machine performance data. In further embodiments, the host recommendation service 302 includes functionality for making recommendations regarding virtual machine placement decisions relative to physical hosts.

Referring now to FIG. 3, and in greater detail, the pool management component requests an identification of a physical host 100 on which to execute a virtual machine 106. In one embodiment, the pool management component 104a requests an identification of a physical host 100b to which to migrate a virtual machine 106b. In another embodiment, the pool management component 104a requests an identification of a physical host 100b on which to provision a virtual machine 106b. In some embodiments, the pool management component 104a receives a request for execution of a virtual machine 106. In one of these embodiments, the pool management component 104a identifies a virtual machine image associated with the requested virtual machine. In other embodiments, the pool management component 104a includes a transmitter sending the request for the identification of the physical host to the host recommendation service 302.

The host recommendation service 302 receives the request for the identification of the physical host 100 on which to execute the virtual machine 106. In one embodiment, the host recommendation service retrieves an identification of a virtual machine based upon information included in the request. In another embodiment, the recommendation service 302 executes the analysis engine 306 upon receiving a request for identification of the physical host 100 on which to execute the virtual machine 106. In some embodiments, for example, the host recommendation service 302 may execute as part of a virtual machine management product, such as a lab management program, provisioning software, or other virtualization platform providing management capabilities.

In one embodiment, the host recommendation service includes a receiver for receiving, from the pool management component 104a, a request for an identification of a physical host on which to execute the virtual machine 106. In another embodiment, the host recommendation service includes a receiver for receiving, from the pool management component 104a, a request for an identification of a physical host to which to migrate the virtual machine 106. In still another embodiment, the host recommendation service 302 includes a user interface for receiving a request for an identification of a physical host on which to execute the virtual machine 106. In yet another embodiment, the host recommendation service 302 includes a user interface for receiving a request for an identification of a physical host to which to migrate the virtual machine 106.

In one embodiment, the host recommendation service 302 includes a customization interface for receiving an identification of a characteristic required for execution of the virtual machine. In another embodiment, the host recommendation service 302 includes a customization interface for receiving an identification of a customization to an algorithm applied to assign the score to each of the plurality of physical hosts. In still another embodiment, the host recommendation service 302 is in communication with a reporting service that provides users with workload distribution and optimization reports; the reporting service may, for example, include, without limitation, functionality for displaying a report in a user interface, transmitting a report via electronic mail, implementing really simple syndication to distribute reports, and providing an application programming interface (API) allowing a user to poll for optimization recommendations and workload reports.

In one embodiment, the host recommendation service 302 executes the analysis engine 306. In another embodiment, the analysis engine applies an algorithm to generate a score assigned to at least one of the plurality of physical hosts. In still another embodiment, the analysis engine 306 determines, for each of the plurality of physical hosts, whether a physical host includes a characteristic required for execution of the virtual machine. In yet another embodiment, the analysis engine 306 includes a process that optimizes host/guest workload. In yet another embodiment, the analysis engine 306 includes a service that generates recommendations for physical hosts on which to execute virtual machines.

The analysis engine 306 executes on the second computing device 100c and is in communication with the host recommendation service 302. In some embodiments, the analysis engine 306 is a component of the host recommendation service 302. In other embodiments, the analysis engine 306 executes on a fourth computing device 100d.

The analysis engine 306 retrieves a plurality of metrics including a first metric identifying a current level of load on each of a plurality of physical hosts and including a second metric identifying a level of load on each of the plurality of physical hosts during a time period prior to the current time period. The analysis engine 306 retrieves a plurality of metrics associated with the virtual machine, the plurality of metrics including at least one metric identifying a level of load placed on a physical host by the virtual machine during a time period prior to the current time period. In one embodiment, the analysis engine 306 includes a database interaction component for accessing the database 316 and retrieving a plurality of metrics from the database 316.

The analysis engine 306 determines a level of priority associated with at least one of the first metric identifying a current level of load on each of the plurality of physical hosts and the second metric identifying a level of load on each of the plurality of physical hosts during a time period prior to the current time period. In one embodiment, a level of priority identifies a period of time to prioritize over other time periods in evaluating and assigning a score to a physical host. In another embodiment, a level of priority identifies a level of availability of a type of resource to prioritize over other resources in evaluating and assigning a score to a physical host. The analysis engine 306 assigns a score to each of the plurality of physical hosts, responsive to the retrieved pluralities of metrics and to the determined level of priority. In one embodiment, the analysis engine 306 applies an algorithm to at least one metric to generate a score assigned to one of the plurality of physical hosts. In another embodiment, the analysis engine 306 transmits, to the host recommendation service 302, an identification of one of the plurality of physical hosts 100 on which to execute the virtual machine.

In one embodiment, a metrics acquisition service 304 acquires performance data and uses the performance data to generate a plurality of metrics including a first metric identifying a current level of load on each of a plurality of physical hosts and including a second metric identifying a level of load on each of the plurality of physical hosts during a time period prior to the current time period. In another embodiment, the metrics acquisition service 304 acquires performance data and uses the performance data to generate a plurality of metrics associated with the virtual machine, the plurality of metrics including at least one metric identifying a level of load placed on a physical host by the virtual machine during a time period prior to the current time period. In still another embodiment, the metrics acquisition service 304 is in communication with the host recommendation service 302.

In one embodiment, the metrics acquisition service 304 stores acquired metrics in a database 316. In another embodiment, the metrics acquisition service 304 stores data in an ODBC-compliant database. For example, the database 316 may be provided as an ORACLE database, manufactured by Oracle Corporation of Redwood Shores, Calif.; as a Microsoft ACCESS database or as a Microsoft SQL server database, manufactured by Microsoft Corporation of Redmond, Wash.

In some embodiments, the metrics acquisition service 304 is in communication with a separate metrics generation service (not shown). In one of these embodiments, the metrics generation service queries at least one of the plurality of physical hosts 100 to retrieve performance data including an identification of a level of load. In another of these embodiments, the metrics acquisition service 304 generates the plurality of metrics for each of the plurality of physical hosts based upon performance data retrieved by the metrics generation service. In other embodiments, the metrics acquisition service 304 queries at least one of the plurality of physical hosts for an identification of a level of load. In one of these embodiments, the metrics acquisition service 304 generates the plurality of metrics for each of the plurality of physical hosts.

In some embodiments, the metrics acquisition service 304 includes a communications component 310, a data collection component 312, and a data collection manager 314. In one of these embodiments, the communications component 310 provides functionality allowing a data collection component 312 executing on a first computing device to communicate with a second data collection component 312 executing on a second computing device. In another of these embodiments, the data collection manager 314 identifies a type of hypervisor executing on a computing device 100b in a plurality of computing device 100. In still another of these embodiments, the data collection manager 314 generates a data collection component 312, responsive to the identified type of hypervisor.

In one of these embodiments, the data collection component 312 communicates with at least one hypervisor to retrieve an identification of performance data for at least one virtual machine executing on a computing device in a pool of computing devices (for example, a computing device 100b); for example, the data collection component 312 may query the at least one hypervisor 101 for an identification of performance data for each virtual machine 106 executed by the hypervisor. In another of these embodiments, the data collection component 312 periodically polls at least one hypervisor 101 for performance data for at least one virtual machine 106 executed by the hypervisor 101. In still another of these embodiments, the data collection component 312 stores the retrieved performance data in the database 316. In yet another of these embodiments, the metrics acquisition service 304 executes a plurality of data collection components 312, each of the plurality of data collection components 312 communicating with and retrieving performance data from a different type of hypervisor.

In some embodiments, the data collection component 312 stores collected data in the database 316. In one of these embodiments, the system includes a queue management component for managing a queue of data to be added to the database. In another of these embodiments, the system includes a queue worker component for retrieving data from a queue of data to be added to the database and storing the retrieved data in the database 316.

In some embodiments, the metrics acquisition service 304 is part of the host recommendation service 302. In other embodiments, the metrics acquisition service 304 executes on the same computing device 100 as the host recommendation service 302. In still other embodiments, the metrics acquisition service 304 executes on a different computing device 100d from the computing device on which the host recommendation service 302 executes. In one of these embodiments, for example, there may be multiple metrics acquisition services 304 in a network. In another of these embodiments, a computing device 100 on which the metrics acquisition service 304 executes may be referred to as a data collection host 100. In still another of these embodiments, there may be a data collection host 100a that collects performance data as well as also coordinating the collection of performance data by data collection components 312 and metrics acquisition services 304 that execute on other data collection hosts 100b; such a data collection host 100a may be referred to as a master data collection host, with the other data collection hosts referred to as slave data collection hosts. In yet another of these embodiments, the master data collection host identifies hypervisors to be monitored and ensures that slave data collection hosts continue to collect performance data for identified hypervisors.

In some embodiments, a master data collection component 312a of the metrics acquisition service 304 communicates with a slave data collection component 312b over an intranet or the Internet as described above in connection with FIGS. 1A-1C. In other embodiments, the master data collection component 312a queries the database 316 to identify at least one data collection slave 312b, the hypervisor pools to be monitored and optimized, and the relationships between hypervisor pools and data collectors; the master data collection component 312a assigns any unassigned hypervisor pools to a data collection host. In still other embodiments, the master data collection component 312a monitors the status of slave data collection hosts and redistributes workload in the event that one of a plurality of data collection hosts terminates data collection. In yet other embodiments, a plurality of slave data collection components 312b monitor the status of the master data collection component 312a and, in the event that the master data collection component 312a ceases to respond to status requests, the slave data collection components 312b identify a replacement master data collection component 312a from amongst the plurality of slave data collection components 312b. In one of these embodiments, data collection hosts may provide both master and slave functionality. In further embodiments, data collection hosts are members of mutually trusted domains.

Figure 4:
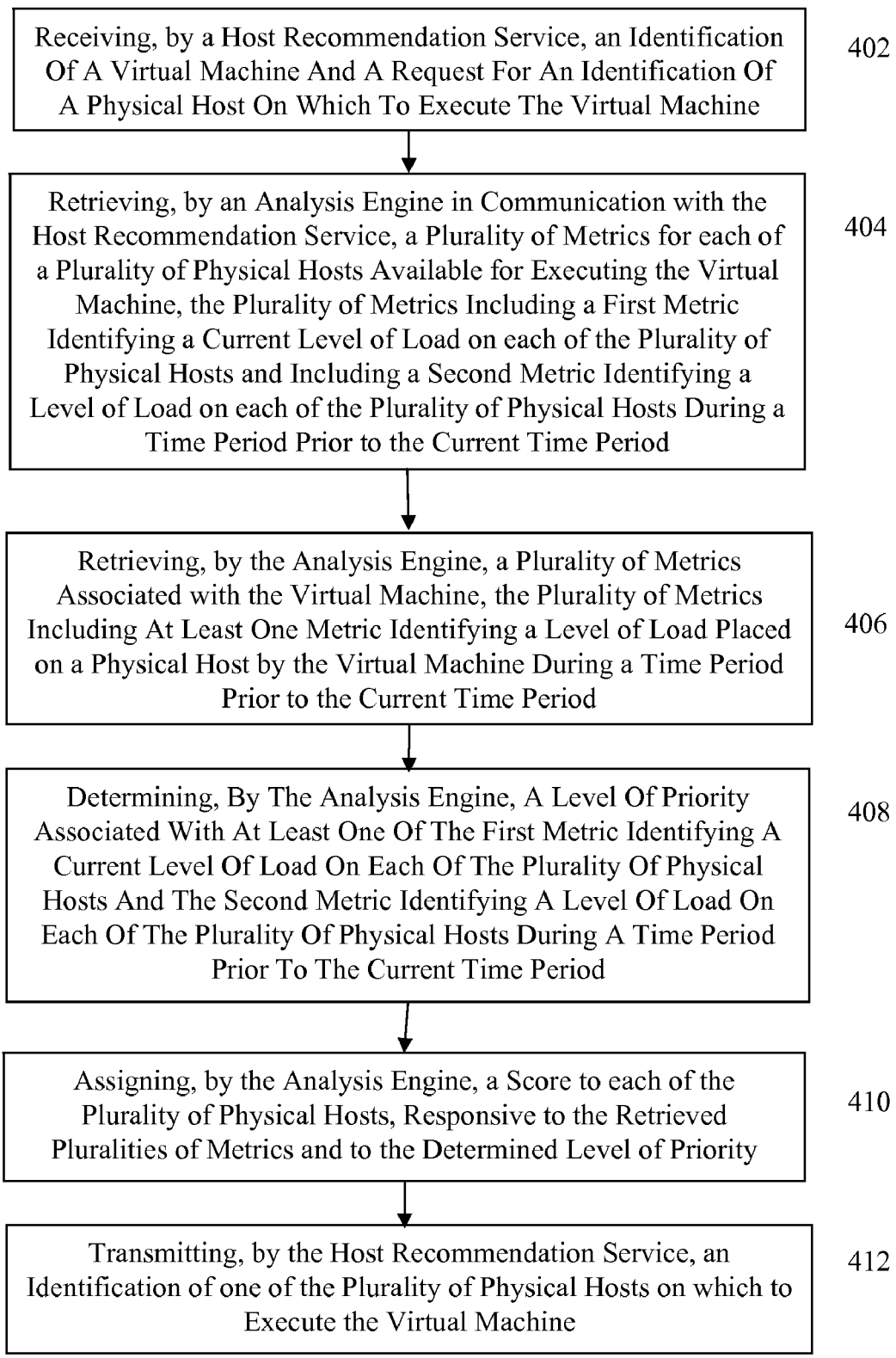
FIG. 4 is a flow diagram depicting an embodiment of a method for evaluating historical metrics in selecting a physical host for execution of a virtual machine.

Referring now to FIG. 4, a flow diagram depicts one embodiment of a method for evaluating historical metrics in selecting a physical host for execution of a virtual machine. In brief overview, the method includes receiving, by a host recommendation service, an identification of a virtual machine and a request for an identification of a physical host on which to execute the virtual machine (402). The method includes retrieving, by an analysis engine in communication with the host recommendation service, a plurality of metrics for each of a plurality of physical hosts available for executing the virtual machine, the plurality of metrics including a first metric identifying a current level of load on each of the plurality of physical hosts and including a second metric identifying a level of load on each of the plurality of physical hosts during a time period prior to the current time period (404). The method includes retrieving, by the analysis engine, a plurality of metrics associated with the virtual machine, the plurality of metrics including at least one metric identifying a level of load placed on a physical host by the virtual machine during a time period prior to the current time period (406). The method includes determining, by the analysis engine, a level of priority associated with at least one of the first metric identifying a current level of load on each of the plurality of physical hosts and the second metric identifying a level of load on each of the plurality of physical hosts during a time period prior to the current time period (408). The method includes assigning, by the host recommendation service, a score to each of the plurality of physical hosts, responsive to the retrieved pluralities of metrics and to the determined level of priority (410). The method includes transmitting, by the host recommendation service, an identification of one of the plurality of physical hosts on which to execute the virtual machine (412). In some embodiments, computer readable media having executable code for evaluating historical metrics in selecting a physical host for execution of a virtual machine are provided.

Referring now to FIG. 4, and in greater detail, a host recommendation service receives an identification of a virtual machine and a request for an identification of a physical host on which to execute the virtual machine (402). In one embodiment, the host recommendation service 302 receives the identification and the request from a pool management component 104, which manages workload on a plurality of physical computing devices in a pool. In another embodiment, the host recommendation service 302 receives the identification and the request via a user interface, such as an interface providing a user access to administrative functionality over an intranet or the Internet. In still another embodiment, the host recommendation service 302 receives an identification of a virtual machine image used to execute the virtual machine. In yet another embodiment, the host recommendation service 302 receives an identification of a resource desired for execution of the virtual machine.

The analysis engine retrieves a plurality of metrics for each of a plurality of physical hosts available for executing the virtual machine, the plurality of metrics including a first metric identifying a current level of load on each of the plurality of physical hosts and including a second metric identifying a level of load on each of the plurality of physical hosts during a time period prior to the current time period (404). In one embodiment, the analysis engine 306 evaluates plurality of metrics and assigns a score to a physical host based upon the evaluation. In another embodiment, the analysis engine 306 accesses a database 316 to retrieve the plurality of metrics. In some embodiments, multiple physical hosts may be available to execute a virtual machine. In one of these embodiments, an optimal physical host is recommended by scoring all the potential hosts and recommending the host with the highest score; the score is calculated using metrics data and numerous, configurable criteria.

In some embodiments, the analysis engine 306 retrieves an identification of at least one physical host available for executing the identified virtual machine. In one of these embodiments, the analysis engine 306 retrieves an identification of a characteristic of the at least one physical host; for example, an identification of a characteristic may include, without limitation, an identification of a number of central processing units (CPUs), an identification of a processing speed of a CPU, an identification of an amount of memory available on a host, and an identification of a number of physical network interfaces provide by a host.

In one embodiment, the analysis engine 306 retrieves a plurality of metrics including a first metric identifying a current level of load on each of the plurality of physical hosts. In another embodiment, the current level of load may include a level of load on a resource in a plurality of resources provided by each of a plurality of physical hosts. In still another embodiment, a user may specify a definition for a period of time classified as a current period of time. In yet another embodiment, and by way of example, an administrator may configure the analysis engine 306 to retrieve a first metric identifying an average level of load over a five-minute period preceding the receipt of the request on each of the plurality of physical hosts; such a time interval may be referred to as a current time period.

In one embodiment, the analysis engine 306 retrieves a plurality of metrics including a second metric identifying a level of load on each of the plurality of physical hosts during a time period prior to the current time period. In another embodiment, the level of load may include a level of load on a resource in a plurality of resources provided by each of a plurality of physical hosts. In still another embodiment, a user may specify a definition for a period of time classified as a period of time prior to the current period of time. In yet another embodiment, and by way of example, an administrator may configure the analysis engine 306 to retrieve a second metric identifying an average level of load over a thirty-minute period preceding the five-minute period prior to receipt of the request on each of the plurality of physical hosts; such a time interval may be referred to as a recent time period.

In one embodiment, the analysis engine 306 retrieves a plurality of metrics including a third metric identifying a level of load on each of the plurality of physical hosts during a time period prior to the time period for which the second metric identified the level of load on each of the plurality of physical hosts. In another embodiment, the analysis engine 306 retrieves a third metric identifying a historical level of load on each of the plurality of physical hosts. In some embodiments, the analysis engine 306 retrieves a third metric configured to identify an average level of load over a substantially longer period of time than the second metric. In other embodiments, the analysis engine 306 retrieves a third metric configured to identify an average level of load for a substantially different period of time than the second metric. In still other embodiments, as with the second metric, a user may specify a definition for a period of time classified as a period of time prior to the current period of time. In one of these embodiments, and by way of example, an administrator may configure the analysis engine 306 to retrieve a third metric identifying an average level of load over a twenty-four hour period preceding the five-minute period prior to receipt of the request on each of the plurality of physical hosts; such a time interval may be referred to as a historical time period.

In one embodiment, the plurality of metrics includes a metric identifying a threshold for utilization of a central processing unit (CPU) on a physical computing device; for example, if a computing device has a high or critical level of CPU utilization during the time period for which the analysis engine 306 evaluates the computing device, the analysis engine 306 may determine that the computing device cannot execute an additional virtual machine. In another embodiment, the plurality of metrics includes a metric identifying a threshold for available memory on a physical computing device; for example, if a computing device has a high or critical level of unavailable memory during the time period for which the analysis engine 306 evaluates the computing device, the analysis engine 306 may determine that the computing device cannot execute an additional virtual machine. In still another embodiment, the plurality of metrics includes a metric identifying a threshold for utilization of network resource by a physical computing device; for example, if a computing device has a high or critical level of network interface utilization during the time period for which the analysis engine 306 evaluates the computing device, the analysis engine 306 may determine that the computing device cannot execute an additional virtual machine. In yet another embodiment, the plurality of metrics includes a metric identifying a threshold for utilization of physical block device (disk utilization) on a physical computing device; for example, if a computing device has a high or critical level of disk utilization during the time period for which the analysis engine 306 evaluates the computing device, the analysis engine 306 may determine that the computing device cannot execute an additional virtual machine. In some embodiments, the analysis engine 306 evaluates a metric for a first computing device and determines that the first computing device can execute an additional virtual machine but has a level of resource utilization associated with a lower score than a second computing device; for example, the first computing device may have a level of resource utilization closer to a threshold (such as a level categorized as medium or high) than the second computing device which may have a lower level of resource utilization. In one of these embodiments, the analysis engine 306 may assign a different (e.g., lower) score to the first computing device for that metric.

The analysis engine retrieves a plurality of metrics associated with the virtual machine, the plurality of metrics including at least one metric identifying a level of load placed on a physical host by the virtual machine during a time period prior to the current time period (406). In some embodiments, the analysis engine 306 accesses a database 316 to retrieve the plurality of metrics.

In one embodiment, the plurality of metrics includes a metric identifying a level of utilization of a central processing unit (CPU) by the virtual machine 106. In another embodiment, the plurality of metrics includes a metric identifying a level of utilization of memory by the virtual machine 106. In still another embodiment, the plurality of metrics includes a metric identifying a level of utilization of a network resource by the virtual machine 106. In yet another embodiment, the plurality of metrics includes a metric identifying a level of disk utilization by the virtual machine 106. In some embodiments, the plurality of metrics includes a metric identifying an average amount of resources required by a virtual machine; for example, the metric may identify, without limitation, an average amount of available memory, average amount of disk utilization, average amount of CPU utilization, and average amount of network resource utilization accessed by the virtual machine during previous executions of the virtual machine.

In some embodiments, the host recommendation service 302 executes a customization interface 308 with which a user, such as an administrator, can configure one or more weights to apply to a plurality of metrics and, therefore, customize a level of significance ascribed to each of the plurality of metrics for a particular physical host in determining whether to identify the physical host as the computing device on which to execute the virtual machine. In one of these embodiments, the customization interface 308 provides functionality allowing a user to specify a level of priority to assign to a time period during which at least one metric is generated; for example, the customization interface 308 may include an interface element allowing a user to specify that metrics generated during a historical time period are to be assigned greater level of priority than metrics generated during a current time period. In another of these embodiments, the customization interface 308 provides functionality allowing a user to specify a weight to apply in scoring a metric generated during a user-specified time period.

In other embodiments, the host recommendation service 302 executes a customization interface with which a user, such as an administrator, can configure one or more rules to apply in determining a score for a physical host. In one of these embodiments, for example, a rule may specify a quantity of an available resource—memory, disk utilization, or CPU utilization, for example—that a physical host should provide for a virtual machine. In other embodiments, the host recommendation service 302 executes customization interface with which a user, such as an administrator, can configure one or more optimization preferences. In one of these embodiments, for example, a user may specify that the host recommendation service 302 should assign higher scores to physical hosts that provide resources for maximizing performance of a virtual machine (which may be referred to as a maximum performance optimization mode). In another of these embodiments, for example, a user may specify that the host recommendation service 302 should assign higher scores to physical hosts that provide resources for a plurality of virtual machines, minimizing the number of total physical hosts required to manage a total workload across a plurality of physical hosts (which may be referred to as a maximum density optimization mode). In still another of these embodiments, for example, a user may specify a time period in which the host recommendation service 302 should operating according to an optimization mode. In yet another of these embodiments, for example, a user may specify a first time period in which the host recommendation service 302 should operating according to a first optimization mode and a second time period in which the host recommendation service 302 should operating according to a second optimization mode.

The analysis engine determines a level of priority associated with at least one of the first metric identifying a current level of load on each of the plurality of physical hosts and the second metric identifying a level of load on each of the plurality of physical hosts during a time period prior to the current time period (408). In one embodiment, the analysis engine 306 accesses a database of data stored by the host recommendation service 302 and identifying a level of prioritization to apply to a metric. In another embodiment, for example, in assigning a score to the physical host providing a resource, such as disk space or CPU utilization, the analysis engine 306 retrieves data identifying a weight to apply to a level of available resource utilization, such as a level of available disk space or a level of CPU utilization available; the analysis engine 306 generates an initial score for a physical host based upon an evaluation of a level of availability for a resource provided by the physical host, determines that a weight is associated with the level of availability of the resource, and modifies the initial score for the physical host based upon the weight. In still another embodiment, and as another example, the analysis engine 306 may retrieve data identifying a weight to apply to a time period for which a metric identifies a level of load on at least one of the physical host and a resource provided by the physical host; for example, the analysis engine 306 generates an initial score for a physical host, determines that an evaluated metric identifies a level of load during a time period (e.g., the current time period or a historic time period) weight is associated with the metric and modifies the initial score according to the determined weight.

In some embodiments, the analysis engine 306 retrieves an identification of an algorithm to apply in identifying a physical host to execute a virtual machine. In one of these embodiments, for example, the analysis engine 306 retrieves an identification of an algorithm that generates higher scores for potential hosts providing resources for maximizing performance of a virtual machine. In another of these embodiments, and as another example, the analysis engine 306 retrieves an identification of an algorithm that generates higher scores for potential hosts capable of executing multiple virtual machines, resulting in maximum density of virtual machines per physical host and a reduced number of physical hosts to manage a total amount of workload. In other embodiments, the analysis engine 306 analyzes a metric in the plurality of metrics and a weight assigned to that metric in determining a level of resource utilization required by an execution of the virtual machine 106.

The analysis engine assigns a score to each of the plurality of physical hosts, responsive to the retrieved pluralities of metrics and to the determined level of priority (410). In one embodiment, the analysis engine 306 analyzes each of the metrics in the pluralities of metrics and assigns a score to each of the plurality of physical hosts. In another embodiment, the analysis engine 306 determines, for each of the plurality of physical hosts, whether a physical computing device includes a storage repository required for execution of the virtual machine 106. In still another embodiment, the analysis engine 306 determines, for each of the plurality of physical hosts, whether a physical computing device includes a level of available memory required for execution of the virtual machine 106. In yet another embodiment, the analysis engine 306 determines, for each of the plurality of physical hosts, whether a physical computing device includes a level of available CPU required for execution of the virtual machine 106. In some embodiments, the analysis engine 306 evaluates pool configuration data, host configuration data, and the pluralities of metrics to determine a score for each of the plurality of physical hosts.

In one embodiment, the analysis engine 306 identifies a first physical host in the plurality of physical hosts for execution of the virtual machine, the first physical host having a higher score than a second physical host in the plurality of physical hosts. In another embodiment, the analysis engine 306 identifies a first physical host in the plurality of physical hosts for execution of the virtual machine, the first physical host including at least one characteristic required for execution of the virtual machine as identified by a weight associated with a metric prioritizing a high level of availability of the at least one characteristic. In some embodiments, the analysis engine 306 identifies a first physical host in the plurality of physical hosts for execution of the virtual machine, the first physical host executing a second virtual machine. In one of these embodiments, the analysis engine 306 identifies a first physical host executing a plurality of virtual machines in order to maximize the density of virtual machines per physical host in the plurality of physical hosts.

In some embodiments, the analysis engine 306 identifies a physical host executing multiple processors or a parallel processor with one or more cores. In one of these embodiments, for example, the physical host may be a computing device 100 as described above in connection with FIGS. 1D and 1E. In another of these embodiments, the analysis engine 306 identifies a processor in a plurality of processors on which to execute the virtual machine. In still another of these embodiments, the analysis engine 306 identifies a portion of a multicore processor with which to execute the virtual machine. In yet another of these embodiments, the analysis engine 306 identifies a subset of available processors on a physical host for execution of a virtual machine. In other embodiments, the analysis engine 306 identifies both a physical host and a subset of available processors on a physical host for execution of a virtual machine. In still other embodiments, the analysis engine 306 receives an identification of a physical host and, implementing the methods described herein, identifies a processor in a plurality of processors on which to execute a virtual machine.

In one embodiment, the analysis engine 306 selects a physical host for execution of the virtual machine such that workload is distributed substantially evenly across a plurality of physical computing devices 100 in order to maximize the performance of each virtual machine. In another embodiment, the analysis engine 306 selects a physical host for execution of the virtual machine such that each physical host in the plurality of computing devices hosts as many virtual machines as the physical host has resources to support, in order to minimize the number of physical hosts. In some embodiments, the analysis engine 306 executes a customization interface with which a user, such as an administrator, can select an optimization mode in which the analysis engine 306 should execute; for example, the administrator may configure the analysis engine 306 to prioritize performance, placing a virtual machine on a physical host that will provide improved performance for the virtual machine, or, in another example, the administrator may configure the analysis engine 306 to maximize density, minimizing the number of physical hosts required to run a total number of virtual machines (the workload for the pool of physical hosts).

In one embodiment, the analysis engine 306 assigns a score including a sub-score assigned to a resource provided by each of the plurality of physical hosts, responsive to the retrieved pluralities of metrics. In another embodiment, the analysis engine 306 generates a score based upon a plurality of sub-scores including scores assigned to, without limitation, a level of available CPU utilization, a level of available memory, a level of available network resource utilization, and a level of available disk utilization. In still another embodiment, each of a plurality of sub-scores are divided into metrics from a plurality of different time periods; for example, the plurality of different time periods may include a current time period, a recent time period, and a historical time period. In yet another embodiment, a level of available utilization of a resource is adjusted based on an anticipated level of utilization by the virtual machine; for example, an initial level of available CPU utilization may be identified as a percentage of total CPU utilization available and then reduced by an amount of CPU utilization used by the virtual machine in previous sessions.

In some embodiments, in which the analysis engine 306 distributes virtual machine workload to as few physical hosts as possible, the scoring process may include computing a scaling factor to allow for a balance between performance and density with extra weights applied towards density. In other embodiments, in which the analysis engine 306 distributes virtual machine workload to physical hosts able to maximize the performance of each virtual machine, the analysis engine 306 may sort a plurality of virtual machines for which it has received requests for identifications of physical hosts, sorting the plurality of virtual machines into an enumerated list that, for example, places virtual machines with higher scores—and, therefore, greater requirements for resources than other virtual machines—at the beginning of the list. In one of these embodiments, by identifying a physical host for a virtual machine with a higher score sooner than for a virtual machine with a lower score, the analysis engine 306 increases the probability that a physical host with the resources to maximize performance of the virtual machine will be available.

The host recommendation service transmits an identification of one of the plurality of physical hosts on which to execute the virtual machine (412). In one embodiment, the analysis engine transmits the identification of one of the plurality of physical hosts on which to execute the virtual machine to the host recommendation service 302. In some embodiments, the host recommendation service 302 transmits the identification to the pool management component 104a. In other embodiments, the host recommendation service 302 directs a display of the identification in a user interface from which the host recommendation service 302 received the request. In other embodiments, the host recommendation service 302 transmits data identifying workload-related trends with the identification. In further embodiments, the host recommendation service 302 transmits workload-related reports with the identification.

In some embodiments, the host recommendation service 302 provides pool optimization recommendations. In one of these embodiments, the analysis engine 306 generates a pool optimization recommendation. In another of these embodiments, the analysis engine 306 monitors a plurality of metrics for each of a plurality of physical hosts in a pool. In still another of these embodiments, the analysis engine 306 determines, for each of the plurality of physical hosts, whether, for any of the metrics in the plurality of metrics, the physical hosts exceeds a configured limit for a specified threshold of time; for example, the analysis engine 306 may determine that a physical host 100b has exceeded a threshold limiting an amount of CPU utilization. In another of these embodiments, the host recommendation service 302 recommends migration of a virtual machine from a physical host that exceeds a threshold to a different physical host in order to optimize distribution of workload throughout the pool of physical hosts; the host recommendation service 302 may identify the physical host to which to migrate the virtual machine using the methods and systems described above. In yet another of these embodiments, the host recommendation service 302 provides a user with a notification of the exceeded threshold and any migration recommendations identified.

In some embodiments, the methods and systems described herein provide functionality facilitating the identification of physical hosts on which to execute virtual machines. In one of these embodiments, by evaluating historical data associated with both the physical hosts and the virtual machines, the methods and systems described herein provide optimized placement of virtual machines and improved management of workload levels for a plurality of physical hosts.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for evaluating historical metrics in selecting a physical host for execution of a virtual machine, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for evaluating historical metrics in selecting a physical host for execution of a virtual machine, the method comprising:
   receiving, by a host recommendation service, an identification of a virtual machine and a request for an identification of a physical host on which to execute the virtual machine;
   retrieving, by an analysis engine in communication with the host recommendation service, a first plurality of metrics for each of a plurality of physical hosts available for executing the virtual machine, each of the first plurality of metrics identifying a current level of load on a respective one of the plurality of physical hosts;
   retrieving, by the analysis engine, a second plurality of metrics for each of the plurality of physical hosts, each of the second plurality of metrics identifying a level of load on a respective one of the plurality of physical hosts at a time period prior to the current time period;
   retrieving, by the analysis engine, a third plurality of metrics associated with the virtual machine, each of the third plurality of metrics identifying a level of load placed on a respective physical host by the virtual machine during a time period prior to the current time period;
   determining, by the analysis engine, a level of priority of at least one of the first plurality of metrics identifying a current level of load on each of the plurality of physical hosts and the second plurality of metrics identifying a level of load on each of the plurality of physical hosts during a time period prior to the current time period;
   assigning, by the analysis engine, a score to each of the plurality of physical hosts to maximize performance of the identified virtual machine, responsive to the retrieved first, second, and third pluralities of metrics and to the determined level of priority; and
   transmitting, by the host recommendation service, an identification of one of the plurality of physical hosts on which to execute the virtual machine.

2. The method of claim 1, further comprising retrieving, by the analysis engine, a fourth plurality of metrics for each of the plurality of physical hosts available for executing the virtual machine, each of the fourth plurality of metrics identifying a level of load on a respective one of the plurality of physical hosts during a time period prior to the time period for which the second plurality of metrics identified the level of load on each of the plurality of physical hosts.

3. The method of claim 1 further comprising identifying, by the analysis engine, a first physical host in the plurality of physical hosts for execution of the virtual machine, the first physical host having a higher score than a second physical host in the plurality of physical hosts.

4. The method of claim 1 further comprising identifying, by the analysis engine, a first physical host in the plurality of physical hosts for execution of the virtual machine, the first physical host including at least one characteristic for maximizing the performance of the virtual machine.

5. The method of claim 1, wherein the physical host identified for execution of the virtual machine is simultaneously executing a second virtual machine.

6. The method of claim 1 further comprising identifying, by the analysis engine, a first physical host in the plurality of physical hosts for execution of the virtual machine, the first physical host including at least one characteristic required for execution of the virtual machine.

7. The method of claim 1, wherein the score assigned to one or more of the plurality of physical hosts is based at least in part on a sub-score assigned to a resource of each physical host, responsive to at least one of the retrieved first and second pluralities of metrics.

8. The method of claim 1 further comprising transmitting, by the analysis engine, the identification of one of the plurality of physical hosts on which to execute the virtual machine.

9. A system for evaluating historical metrics in selecting a physical host for execution of a virtual machine, the system comprising:
   a pool management component executing on a first computing device requesting an identification of a physical host on which to execute a virtual machine;
   a host recommendation service executing on a second computing device receiving the request for the identification of the physical host;
   an analysis engine executing on the second computing device, the analysis engine:
     receiving, from the host recommendation service, the request;
     retrieving a first plurality of metrics, each identifying a current level of load on a respective one of a plurality of physical hosts;
     retrieving a second plurality of metrics, each identifying a level of load on a respective one of the plurality of physical hosts during a time period prior to the current time period,
     retrieving a third plurality of metrics associated with the virtual machine, each of the third plurality of metrics identifying a level of load placed on a respective physical host by the virtual machine during a time period prior to the current time period;

determining a level of priority of at least one of the first plurality of metrics and the second plurality of metrics;

assigning a score to each of the plurality of physical hosts, responsive to the retrieved first, second, and third pluralities of metrics and to the determined level of priority in order to maximize performance of the identified virtual machine; and transmitting, to the host recommendation service, an identification of one of the plurality of physical hosts on which to execute the virtual machine.

10. The system of claim 9, wherein the host recommendation service further comprises a receiver for receiving, from the pool management component, a request for an identification of a physical host on which to execute the virtual machine.

11. The system of claim 9, wherein the host recommendation service further comprises a receiver for receiving, from the pool management component, a request for an identification of a physical host to which to migrate the virtual machine.

12. The system of claim 9, wherein the host recommendation service further comprises a user interface for receiving a request for an identification of a physical host on which to execute the virtual machine.

13. The system of claim 9, wherein the host recommendation service further comprises a user interface for receiving a request for an identification of a physical host to which to migrate the virtual machine.

14. The system of claim 9, wherein the host recommendation service further comprises a customization interface for receiving an identification of a characteristic required for execution of the virtual machine.

15. The system of claim 9, wherein the host recommendation service further comprises a customization interface for receiving an identification of a customization to an algorithm applied to assign the score to each of the plurality of physical hosts.

16. The system of claim 9, wherein the analysis engine further comprises means for applying an algorithm to generate a score assigned to one of the plurality of physical hosts.

17. The system of claim 9, further comprising a metrics acquisition service querying at least one of the plurality of physical hosts for an identification of a level of load.

18. The system of claim 9, further comprising a metrics acquisition service generating the first plurality of metrics for each of the plurality of physical hosts.

19. A system for evaluating historical metrics in selecting a physical host for execution of a virtual machine, comprising:

means for receiving, by a host recommendation service, an identification of a virtual machine and a request for an identification of a physical host on which to execute the virtual machine;

means for retrieving, by an analysis engine in communication with the host recommendation service, a first plurality of metrics for each of a plurality of physical hosts available for executing the virtual machine, each of the first plurality of metrics identifying a current level of load on a respective one of the plurality of physical hosts;

means for retrieving, by an analysis engine, a second plurality of metrics, each identifying a level of load on a respective one of the plurality of physical hosts during a time period prior to the current time period;

means for retrieving, by the analysis engine, a third plurality of metrics associated with the virtual machine, each of the third plurality of metrics identifying a level of load placed on a respective physical host by the virtual machine during a time period prior to the current time period;

means for determining, by the analysis engine, a level of priority of at least one of the first plurality of metrics and the second plurality of metrics;

means for assigning, by the analysis engine, a score to each of the plurality of physical hosts to maximize performance of the identified virtual machine, responsive to the retrieved first, second, and third pluralities of metrics and to the determined level of priority; and means for transmitting, by the host recommendation service, an identification of one of the plurality of physical hosts on which to execute the virtual machine.

20. The system of claim 19 further comprising means for retrieving, by the analysis engine, a fourth plurality of metrics, each identifying a level of load on a respective one of the plurality of physical hosts during a time period prior to the time period for which the second plurality of metrics identified the level of load on each of the plurality of physical hosts.

21. The system of claim 19 further comprising means for identifying, by the analysis engine, a first physical host in the plurality of physical hosts for execution of the virtual machine, the first physical host having a higher score than a second physical host in the plurality of physical hosts.

22. The system of claim 19 further comprising means for identifying, by the analysis engine, a first physical host in the plurality of physical hosts for execution of the virtual machine, the first physical host including at least one characteristic for maximizing the performance of the virtual machine.

23. The system of claim 19, wherein the physical host identified for execution of a virtual machine is simultaneously executing a second virtual machine.

24. The system of claim 19 further comprising means for identifying, by the analysis engine, a first physical host in the plurality of physical hosts for execution of the virtual machine, the first physical host including at least one characteristic required for execution of the virtual machine.

25. The system of claim 19, wherein the score assigned to one or more of the physical hosts is based at least in part on a sub-score assigned to a resource of the physical host, responsive to the retrieved first and second pluralities of metrics.

26. The system of claim 19 further comprising means for transmitting, by the analysis engine, the identification of one of the plurality of physical hosts on which to execute the virtual machine.

* * * * *